United States Patent
Wei et al.

(10) Patent No.: US 9,717,093 B2
(45) Date of Patent: Jul. 25, 2017

(54) ACCESS POINT AND ASSOCIATED ANTENNA SELECTING METHOD

(71) Applicant: Wistron NeWeb Corporation, Hsinchu (TW)

(72) Inventors: Ya-Ping Wei, Hsinchu (TW); Fu-Ming Kang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 103 days.

(21) Appl. No.: 14/856,569

(22) Filed: Sep. 17, 2015

(65) Prior Publication Data

US 2016/0242190 A1 Aug. 18, 2016

(30) Foreign Application Priority Data

Feb. 16, 2015 (TW) .............................. 104105390 A

(51) Int. Cl.
| | | |
|---|---|---|
| *G01R 31/08* | (2006.01) | |
| *H04W 72/08* | (2009.01) | |
| *H04B 7/06* | (2006.01) | |
| *H04B 7/08* | (2006.01) | |
| *H04W 88/08* | (2009.01) | |

(52) U.S. Cl.
CPC ........ *H04W 72/085* (2013.01); *H04B 7/0608* (2013.01); *H04B 7/0802* (2013.01); *H04W 88/08* (2013.01)

(58) Field of Classification Search
CPC .. H04W 72/085; H04W 88/08; H04B 7/0802; H04B 7/0608
See application file for complete search history.

(56) References Cited

U.S. PATENT DOCUMENTS

| | | | | |
|---|---|---|---|---|
| 2003/0083016 A1* | 5/2003 | Evans | ................. | H04B 7/0608 455/67.11 |
| 2009/0290563 A1* | 11/2009 | Gu | ....................... | H04B 7/0608 370/338 |
| 2010/0085925 A1* | 4/2010 | Kishiyama | .......... | H04B 7/0608 370/329 |
| 2011/0143692 A1* | 6/2011 | Sofer | ................... | H04B 7/0608 455/88 |
| 2011/0310931 A1* | 12/2011 | Mehta | .................... | H01Q 1/246 375/133 |
| 2013/0265890 A1* | 10/2013 | Ali | ........................ | H01Q 1/246 370/252 |

(Continued)

FOREIGN PATENT DOCUMENTS

| | | |
|---|---|---|
| CN | 101305525 A | 11/2008 |
| CN | 101039290 B | 8/2010 |
| TW | 201021291 A1 | 6/2010 |

*Primary Examiner* — Robert Wilson
(74) *Attorney, Agent, or Firm* — Winston Hsu

(57) ABSTRACT

An access point includes an antenna module, a wireless network module and a processor, wherein when the access point connects with an electronic device and operates in a training stage to determine at least an optimal antenna for the electronic device, the processor determines a number of a plurality of training packets, a delay time between the plurality of training packets and a length of at least one of the plurality of training packets according to a connecting status between the access point and the electronic device, and transmits the plurality of training packets to the electronic device via the wireless network module and the antenna module.

20 Claims, 3 Drawing Sheets

(56) References Cited

U.S. PATENT DOCUMENTS

| | | | | |
|---|---|---|---|---|
| 2014/0376355 | A1* | 12/2014 | Kudo | H04B 7/0456 |
| | | | | 370/203 |
| 2015/0264584 | A1* | 9/2015 | Dayanandan | H01Q 3/46 |
| | | | | 455/562.1 |
| 2015/0341095 | A1* | 11/2015 | Yu | H04B 7/0619 |
| | | | | 370/252 |
| 2016/0242190 | A1* | 8/2016 | Wei | H04W 72/085 |
| 2016/0277993 | A1* | 9/2016 | Wei | H04W 40/06 |
| 2016/0337011 | A1* | 11/2016 | Ying | H04B 7/0874 |

* cited by examiner

ACCESS POINT AND ASSOCIATED ANTENNA SELECTING METHOD

BACKGROUND OF THE INVENTION

1. Field of the Invention

The present invention relates to an access point, and more particularly, to a method of selecting at least an optimal antenna within an antenna module of an access point.

2. Description of the Prior Art

When an electronic device such as a laptop, smart phone or tablet connects to an access point having a plurality of antennas, the access point performs a training procedure for transmitting a plurality of training packets to the electronic device. According to the response of the electronic device to the plurality of training packets, the access point then determines an optimal antenna for the electronic device or an optimal directionality of the antenna which can achieve the best connection quality.

The quality of the connection between the electronic device and the access point may affect whether the transmission of the training packets succeeds and also affect whether the training procedure can be finished successfully. Specifically, when the connecting quality is good, the optimal antenna can be easily determined by the access point. When the connecting quality is poor, the time for the electronic device to receive the training packets is extended. While the transmitting speed of the training packets is fixed, the access point may send training packets without considering the quality of the connection environment. Therefore, when the connecting quality is poor and the number of packets is increased, the possibility of Transmitter time out is also increased, which might cause the training procedure cannot be finished and the failure of selection of an optimal antenna for the access point. In a worse situation, it may undermine transmission efficiency of the electronic device and success rate of data transmission.

SUMMARY OF THE INVENTION

One of the objectives of the present invention is therefore to provide a method of selecting one or one set of optimal antenna(s) in an antenna module of an access point, which can prevent the training procedure from being affected by poor connecting quality.

According to an embodiment of the present invention, an access point comprises an antenna module, a wireless network module and a processor, wherein when the access point connects with an electronic device and operates under a training stage for determining at least an optimal antenna for the electronic device, the processor determines quantity number of a plurality of training packets and a delay time between the plurality of training packets or a length of at least one of the plurality of training packets according to a connecting status between the access point and the electronic device, and sends the plurality of training packets to the electronic device via the wireless network module and the antenna module.

According to another embodiment of the present invention, an antenna selecting method for an access point is disclosed, wherein the access point comprises an antenna module, the antenna module comprises a plurality of antennas, and the antenna selecting method comprises: connecting with an electronic device, and operating under a training stage; determining a number of a plurality of training packets and a delay time between the plurality of training packets or a length of at least one of the plurality of training packets according to a connecting status between the access point and the electronic device; sending the plurality of training packets to the electronic device; and determining at least an optimal antenna for the electronic device according to a response of the electronic device corresponding to the plurality of training packets.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
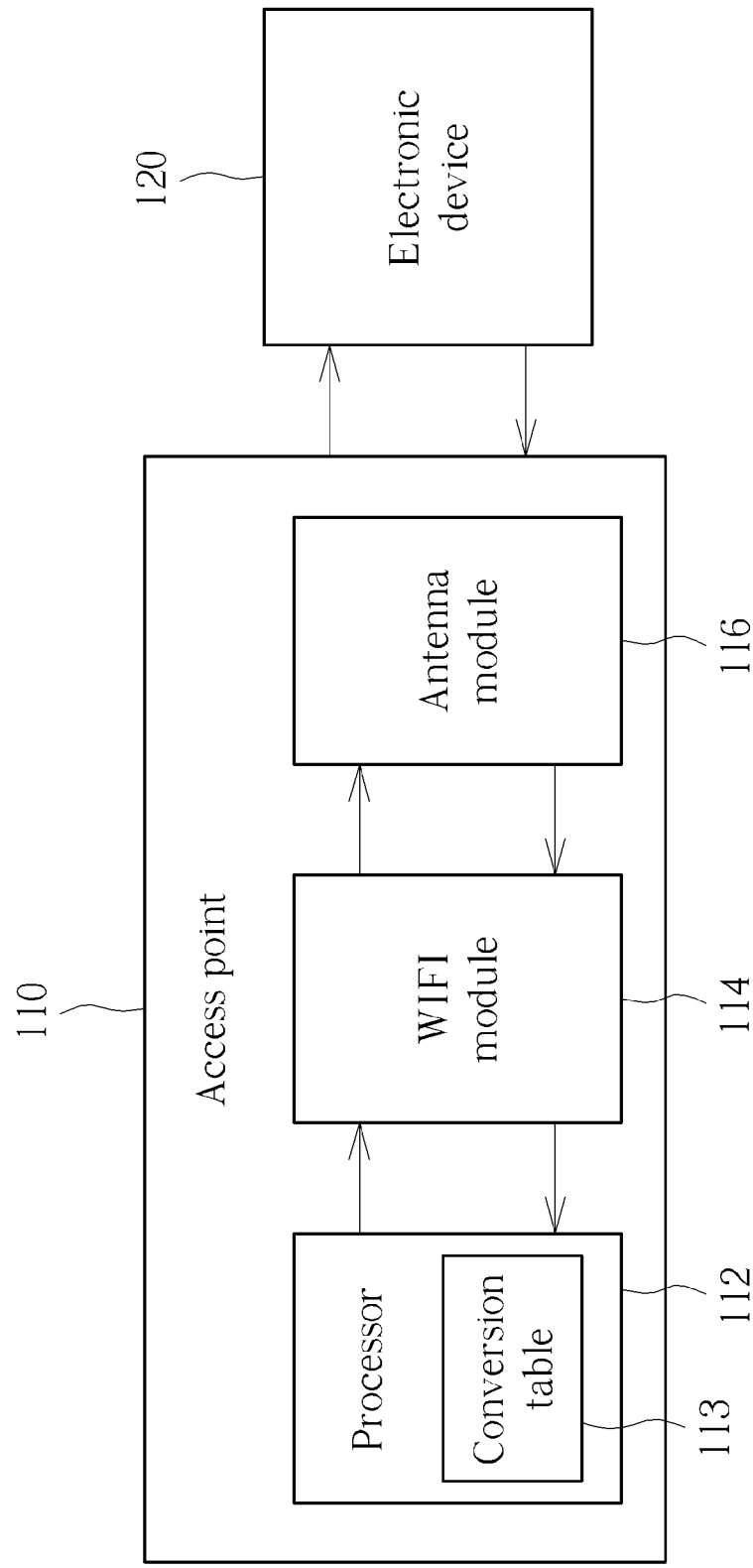
FIG. 1 is a diagram illustrating an access point according to an embodiment of the present invention.

FIG. 1 is a diagram illustrating an access point 110 according to an embodiment of the present invention. As shown in FIG. 1, the access point 110 is connected to the internet via wire or wireless, and is an intermediary for the electronic device 120 to connect with other internet accessible devices in order to send information. The access point 110 mainly comprises a processor 110, a wireless network module 114 and an antenna module 116, wherein the processor 112 comprises a conversion table 113, and the antenna module 116 comprises a plurality of antennas. In addition, in this embodiment, the plurality of antennas included within the antenna module 116 can be unidirectional, multidirectional (e.g. two directionalities) or omnidirectional. In an embodiment, each antenna of the antenna module 116 is an antenna array, the antenna array comprises a plurality of directional antennas, and the plurality of directional antennas can be selectively enabled or disabled.

In this embodiment, the conversion table 113 records Modulation and Coding Scheme (MCS) codes employed by the access point 110, a plurality of levels of the connecting strength corresponding to each of the MCS codes, and a number of a plurality of training packets corresponding to each level of the connecting strength, the delay time between the plurality of training packets corresponding to each level of the connecting strength, and the length of at least one of the plurality of training packets corresponding to each level of the connecting strength, wherein the content of the conversion table 113 is illustrated in table 1. It should be noted that the content of table 1 is only an illustration and not a limitation of the present invention.

TABLE 1

| Level of connecting strength | MSC code | number of training packet | The delay time between two training packets | Length of training packet |
|---|---|---|---|---|
| 0 | 0xE9 | S | X | K |
| 1 | 0xW7 | S * (1/5) | X + C * 1 | K * (1/2$^1$) |
| ... | ... | ... | ... | ... |
| n | 0xC0 | S * (1/5n) | X + C * n | K * (1/2$^n$) |

In table 1, the connecting quality has n levels, wherein higher levels correspond to poorer connecting strength. Accompanying the decrease of the connecting strength, the number of the plurality of training packets becomes fewer, e.g. the connecting strength is proportional to the number of the plurality of training packets, and the delay time between two training packets becomes longer, and the length of the at least one of the training packet becomes shorter. In other words, the connecting strength can be inverse proportional to the length of the training packet. In table 1, S can be 10, X can be 2 micro seconds, C can be 2 micro seconds and K can be 1000 bytes approximately, but these values are only for illustrative purposes, and are not a limitation of the present invention.

Figure 2:
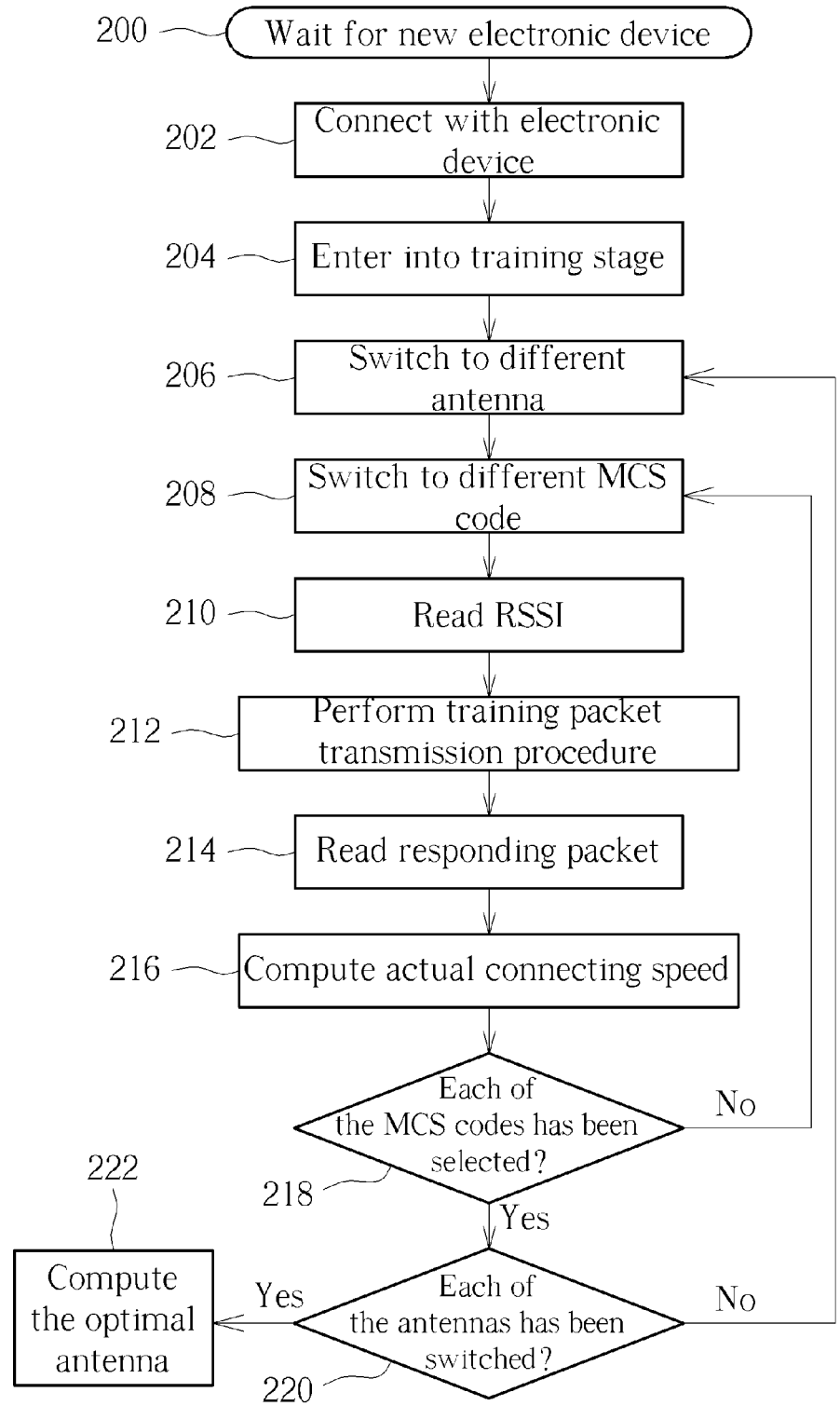
FIG. 2 is a flowchart illustrating a method of selecting a set of optimal antennas in an antenna module of the access point according to an embodiment of the present invention.
Figure 3:
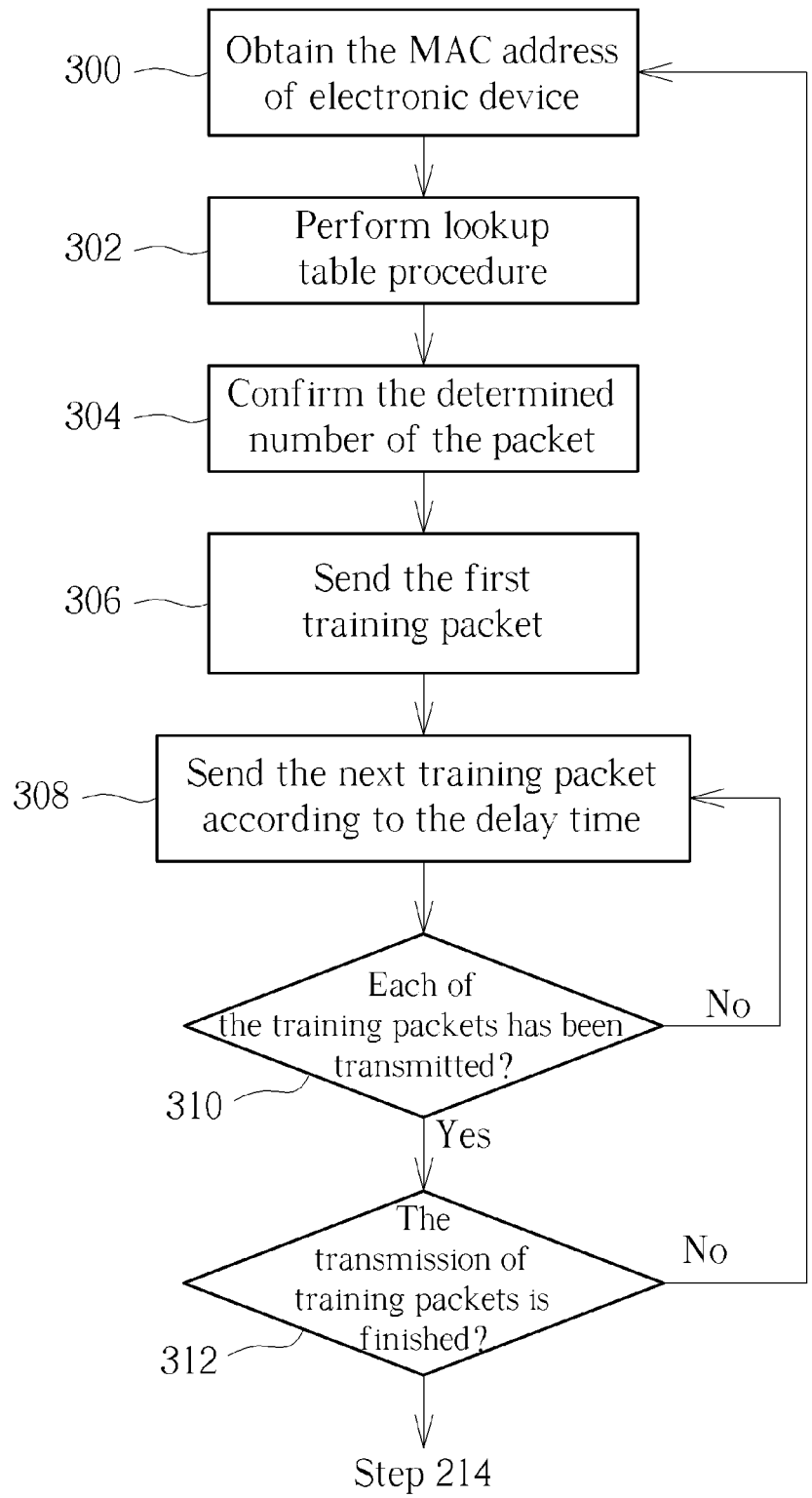
FIG. 3 is a detailed flowchart of step 212 shown in FIG. 2.

FIGS. 2 and 3 are flowcharts illustrating a method of selecting a set of optimal antennas in an antenna module 116 of the access point 110 according to an embodiment of the present invention, wherein the following explanation assumes each antenna of the antenna module 116 is an antenna array, the antenna array comprises a plurality of directional antennas, and the flowcharts shown in FIGS. 2 and 3 are arranged to select a directional antenna in each antenna for obtaining a set of optimal antennas. Assuming the antenna module 116 has three antennas and each antenna comprises two directional antennas, then the flowcharts shown in FIGS. 2 and 3 are for selecting a directional antenna from each of these three antennas, respectively, and these three chosen directional antennas constitute a set of optimal antennas. With reference to FIGS. 2 and 3 and table 1, the flowcharts are described as follows.

In step 200, the access point 110 is waiting for connecting with a new electronic device, i.e. the access point 110 at this time has not yet connected with the electronic device 120. In step 202, the electronic device 120 connects with the access point 110, and performs a connection initialization operation, wherein the access point 110 sends a plurality of non-training packets to the electronic device 120, e.g. using a "Ping" (Packet InterNet Grope) command for transmitting an Internet Control Message Protocol (ICMP) packet. At this time, the wireless network module 114 of the access point 110 computes a temporary MCS code according to the response of the electronic device 120 for connecting and transmitting packets with the electronic device 120.

In step 204, the access point 110 starts a training stage to decide a set of optimal antennas for the electronic device 120. In step 206, the access point 110 switches the directionality of each antenna to choose one of the directional antennas from each antenna. In step 208, the access point 110 switches different MCS codes and uses the switched MCS code to perform training packet transmission with the electronic device 120 in the following steps. In step 210, the access point 110 reads the Received Signal Strength Indication (RSSI) of the received packet.

In step 212, the access point 110 starts the training packet sending procedure. FIG. 3 is a detailed flowchart of the training packet sending procedure. In step 300, the processor 112 obtains the Media Access Control Address, (MAC address) of the electronic device 120, and in the following step 302, the processor 110 performs a checking table procedure to determine the number of training packets, the delay time between two training packets and length of training packet according to the connecting status. In this embodiment, the processor 112 uses the current employed MCS code to determine the level of connecting strength n between the access point 110 and the electronic device 120 from the conversion table 113, and computes the number of the training packet, the delay time between two training packets and the length of the training packet according to the formula in table 1.

In step 304, the processor 112 configures the number of training packets which need to be sent during a specific time according to the number of training packets decided in step 302, and in step 306, the processor 112 starts sending a first training packet to the electronic device 120 according to the length of training packet decided in step 302. Next, in step 308, the processor 110 sends the next training packet to the electronic device 120 according to the delay time between two training packets according to step 302. In step 310, the processor 112 determines whether each of the training packets has been transmitted, i.e. whether the transmission of training packet stage is finished. If yes, the flow goes to step 312; otherwise, the flow goes back to step 308 to send the next training packet. In step 312, the processor determines if the transmission of training packets is finished successfully. If yes, the flow goes to step 214 shown in FIG. 2; otherwise, the flow goes back to step 300 to restart the training packet sending procedure.

In step 214, the processor 112 reads the responding packet sent back by the electronic device 120 corresponding to the training packet. This is because, when the electronic device 120 successfully receives a training packet, it immediately sends back a responding packet to the access point 110 to notify that the training packet is received. Therefore, the processor 112 reads the responding packet sent by the electronic device 120 in step 214, and computes the number of received responding packets.

In step 216, the processor 112 computes the actual connecting speed between the access point 110 and the electronic device 120 according to the number of received responding packets. Assume the access point 110 sends 10 packets to the electronic device 120, but the electronic device 120 only receives 5 training packets successfully, and therefore only sends 5 responding packets back to the access point 110. In this case, the actual connecting speed between the access point 110 and the electronic device 120 is half the predetermined connecting speed. That is, if the predetermined connecting speed is 975 Mbps, the actual connecting speed is 487.5 Mbps (975/2=487.5). It should be noted that the determined actual connecting speed in this step is for representing the transmitting quality of the current employing antenna. In other embodiments of the present invention, the actual connecting speed can be replaced with other similar meaningful indication/value, e.g. the success/failure rate of transmitted training packets.

In step 218, the processor 122 determines if each of the MCS codes has been selected successfully. If yes, the flow goes to step 220; otherwise, the flow goes back to step 208 to switch to other MCS codes which have not yet performed a training packet sending procedure.

In step 220, the processor 112 determines if each of the antennas has been selected successfully. If yes, the flow goes to step 222; otherwise, the flow goes back to step 206 to switch to other antennas which have not yet performed a training packet sending procedure.

In step 222, the processor 112 computes a set of optimal antennas for the electronic device 120 according to the RSSI obtained by each antenna in step 210 and the actual connecting speed obtained in step 216, and uses the determined set of optimal antenna as the following transmitting intermediary between the access point 110 and the electronic device 120.

As described by the flow shown in FIGS. 2 and 3, because the number of the plurality of training packets, the delay time between the plurality of training packets and the length of the at least one of the plurality of training packets can be adjusted dynamically according to the connecting strength/speed between the access point 110 and the electronic device 120, problems encountered during the prior art training packet transmission can be improved upon to enhance the success rate in the training stage.

It should be noted that, in the above explanation of FIGS. 2 and 3, the number of the training packet, the delay time between the plurality of training packets and the length of the at least one of the plurality of training packets can be adjusted dynamically according to the MCS code; however, in other embodiments, only one or two of these parameters are dynamically adjusted according to the MCS code, and these alternative designs also fall within the scope of the present invention.

In another embodiment of the present invention, the steps 208 and 218 in FIG. 2 can be removed from the flow. Because the MCS code computed by the access point 110 before operating in the training stage can reflect the connecting quality between the access point 110 and the electronic device 120, the MCS code decided in step 202 can be used for the checking table procedure in step 302 for obtaining the corresponding level of connecting strength, and determining the number of the plurality of training packets, the delay time between the plurality of training packets and the length of the at least one of the plurality of training packets accordingly.

The access point 110 uses the MCS code for determining connecting status (level of connecting strength) in the abovementioned embodiments; however, in other embodiments of the present invention, the access point 110 can use any parameter to represent the connecting status. In particular, any parameter related to connecting strength, connecting speed and connecting quality can be used for determining the number of the plurality of training packets, the delay time between the plurality of training packets and/or the length of the at least one of the plurality of training packets.

In addition, although the explanations in FIGS. 2 and 3 are for determining a set of optimal antennas, in another embodiment of the present invention, the same flow can be used for determining an optimal antenna. One skilled in the art should readily understand how to implement this procedure after reading the explanation above related to determining a set of optimal antennas, and the details are omitted here for brevity.

Summarizing the present invention, in the access point, the packet number of a plurality of training packets, the delay time between the plurality of training packets and the length of the at least one of the plurality of training packets can be adjusted dynamically during the training stage according to a current connecting quality in order to determine an optimal antenna for transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An access point, comprising:
a plurality of antennas;
a wireless network circuit, coupled to the plurality of antennas; and
a processor, coupled to the wireless network circuit;
wherein when the processor of the access point is connected with an electronic device via the plurality of antennas and operates in a training stage to determine at least an optimal antenna for the electronic device, the processor determines a number of a plurality of training packets, a delay time between the plurality of training packets, or a length of at least one of the plurality of training packets according to a connecting status between the processor of the access point and the electronic device, and transmits the plurality of training packets to the electronic device via the wireless network circuit and the plurality of antennas.

2. The access point of claim 1, wherein each antenna comprises a plurality of directional antennas, and when the processor of the access point operates in the training stage, the processor selects one directional antenna from each antenna for determining a set of optimal antennas for the electronic device.

3. The access point of claim 1, wherein the processor determines the number of the plurality of training packets according to a connecting strength of the connecting status between the processor of the access point and the electronic device, and the connecting strength is proportional to the number of the plurality of training packets.

4. The access point of claim 1, wherein the processor determines the delay time between the plurality of training packets according to a connecting strength of the connecting status between the processor of the access point and the electronic device, and the connecting strength is inverse proportional to the delay time between the plurality of training packets.

5. The access point of claim 1, wherein the processor determines the length of the at least one of the plurality of training packets according to a connecting strength of the connecting status between the processor of the access point and the electronic device, and the connecting strength is proportional to the lengths of the at least one of the plurality of training packets.

6. The access point of claim 1, wherein the connecting status is a Modulation and Coding Scheme (MCS) code.

7. The access point of claim 6, wherein the processor determines a level of a connecting strength between the processor of the access point and the electronic device according to the MCS code and determines the number of the plurality of training packets, the delay time between the plurality of training packets, or the length of the at least one of the plurality of training packets according to the connecting strength of the connecting status.

8. The access point of claim 6, wherein the connecting status is a current MCS code employed in the processor of the access point and the electronic device.

9. The access point of claim 6, wherein, before the processor of the access point operates in the training stage, the MCS code is produced by the wireless network circuit after the processor of the access point connects with the electronic device.

10. The access point of claim 1, wherein the processor further comprises a conversion table, wherein the conversion table records a plurality of levels of the connecting strength of the connecting status and the number of the plurality of training packets, the delay time between the plurality of training packets, or the length of the at least one of the plurality of training packets corresponds to each level of the connecting strength; and the processor determines the number of the plurality of training packets, the delay time between the plurality of training packets or the length of the at least one of the plurality of training packets according to the connecting strength from the conversion table.

11. The access point of claim 10, wherein connecting status comprises a connecting speed between the processor of the access point and the electronic device.

12. An antenna selecting method of an access point, wherein the access point comprises an antenna module which comprising a plurality of antennas, the antenna selecting method comprising:

- connecting with an electronic device and operating in a training stage;
- determining a number of a plurality of training packets, a delay time between the plurality of training packets or a length of at least one of the plurality of training packets according to a connecting status between the access point and the electronic device;
- transmitting the plurality of training packets to the electronic device; and
- determining at least an optimal antenna for the electronic device according to a response of the electronic device corresponding to the plurality of training packets.

13. The antenna selecting method of claim 12, wherein each antenna of the antenna module comprises a plurality of directional antennas, and when the access point operates in the training stage, the access point selects one directional antenna from each antenna for determining a set of optimal antennas for the electronic device.

14. The antenna selecting method of claim 12, wherein the step of the access point determining the number of the plurality of training packets, the delay time between the plurality of training packets or the length of the at least one of the plurality of training packets according to the connecting status between the access point and the electronic device comprises:

- determining the number of the plurality of training packets according to a connecting strength of the connecting status between the access point and the electronic device, wherein the connecting strength is proportional to the number of the plurality of training packets.

15. The antenna selecting method of claim 12, wherein the step of the access point determining the packet quantity of the plurality of training packets, the delay time between two of the plurality of training packets or the length of packet according to the connecting status between the access point and the electronic device comprises:

- determining the delay time between two of the plurality of training packets according to a connecting magnitude between the access point and the electronic device, wherein when the connecting strength of the connecting status is inverse proportional to the delay time between the plurality of training packets.

16. The antenna selecting method of claim 12, wherein the step of the access point determining the number of the plurality of training packets, the delay time between the plurality of training packets or the length of the at least one of the plurality of training packets according to the connecting status between the access point and the electronic device comprises:

- determining the length of the at least one of the plurality of training packets according to a connecting strength of the connecting status between the access point and the electronic device, wherein the connecting strength is proportional to the length of the at least one of the plurality of training packets.

17. The antenna selecting method of claim 12, wherein the connecting status is a Modulation and Coding Scheme (MCS) code.

18. The antenna selecting method of claim 17, wherein the connecting status is a current employing MCS code of the access point and the electronic device.

19. The antenna selecting method of claim 17, wherein the MCS code is produced by a wireless network circuit after the access point connects with the electronic device, but before the access point operates in the training stage.

20. The antenna selecting method of claim 12, wherein the step of determining the number of the plurality of training packets, the delay time between the plurality of training packets or the length of the at least one of the plurality of training packets according to the connecting status between the access point and the electronic device comprises:

- determining the number of the plurality of training packets, the delay time between two of the plurality of training packets or the length of the at least one of the plurality of training packets according to the connecting strength from a conversion table within the access point, wherein the connecting strength is proportional to the number of the plurality of training packets and the length of the at least one of the plurality of training packets, and is inverse proportional to the delay time between two of the plurality of training packets.

* * * * *